No. 742,456. PATENTED OCT. 27, 1903.
K. G. LAUB.
FRICTION ELEMENT.
APPLICATION FILED APR. 2, 1902.
MODEL. 2 SHEETS—SHEET 2.
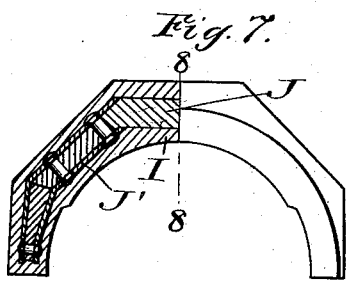
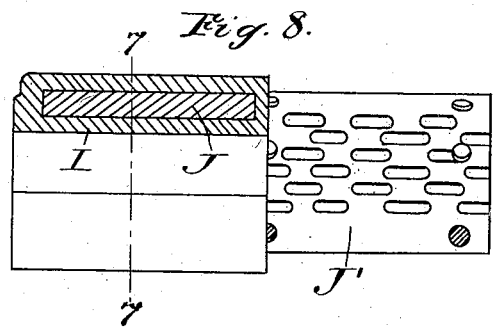
 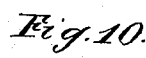 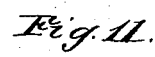 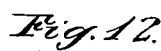
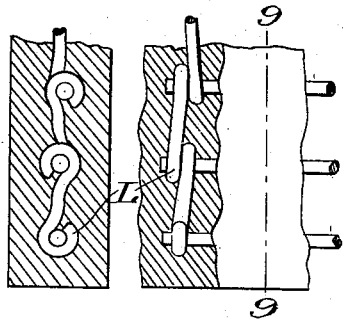
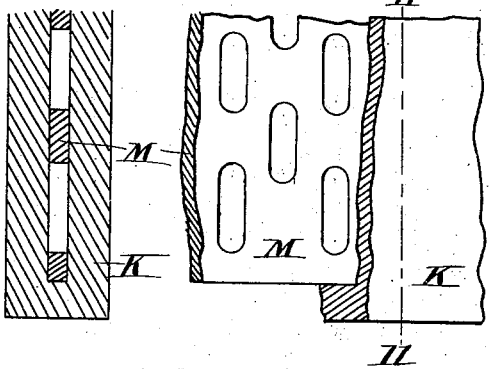
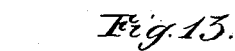
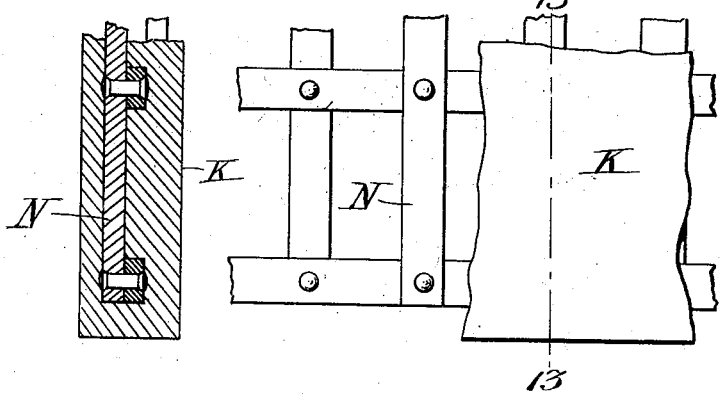
WITNESSES:
John A. Kehlenbeck
John Lotka
INVENTOR
Karl Georg Laub
BY Briesen & Knauth
his ATTORNEYS No. 742,456. Patented October 27, 1903.

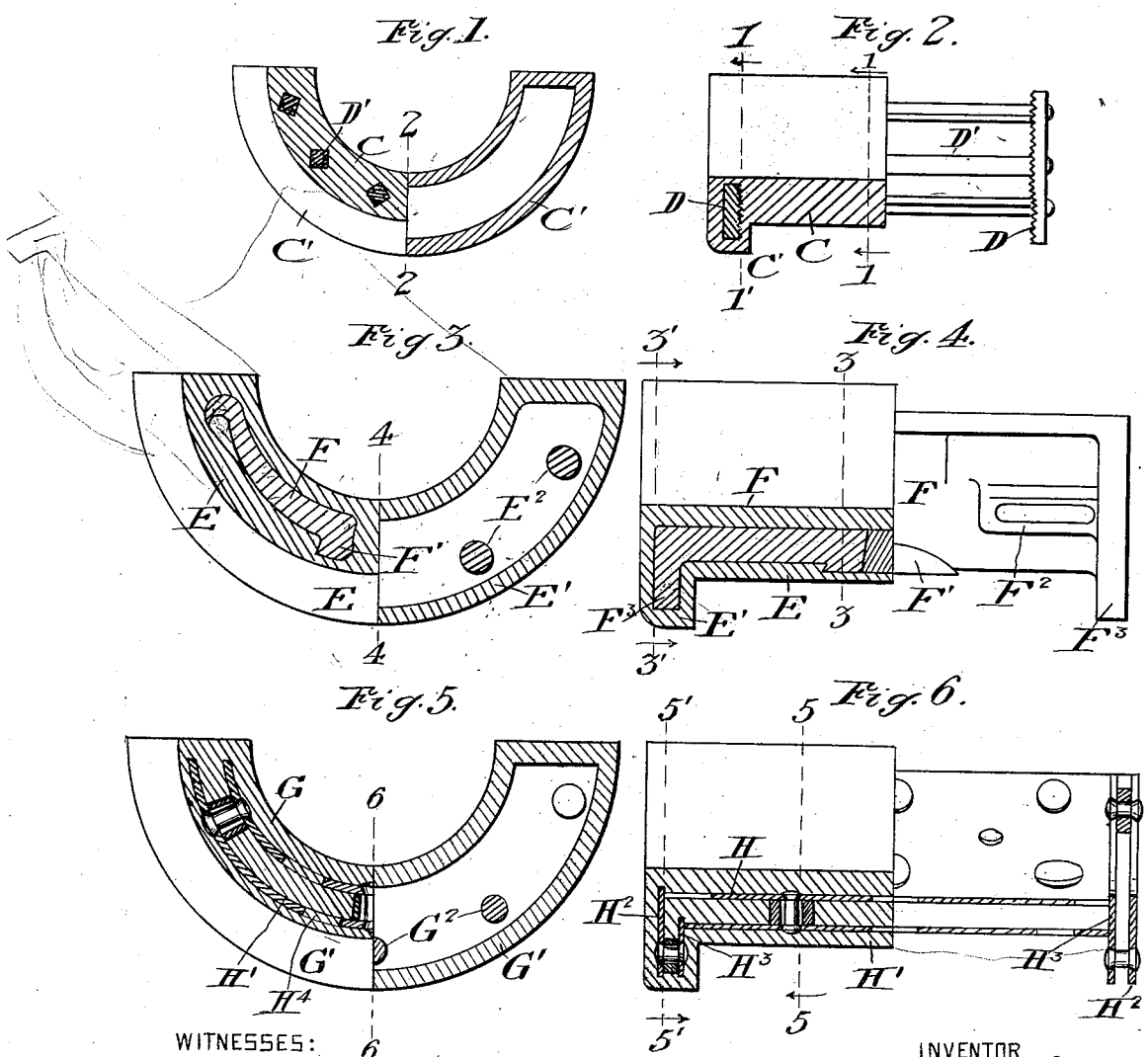

UNITED STATES PATENT OFFICE.

KARL GEORG LAUB, OF MAINZ, GERMANY.

FRICTION ELEMENT.

SPECIFICATION forming part of Letters Patent No. 742,456, dated October 27, 1903.

Application filed April 2, 1902. Serial No. 101,031. (Model.)

*To all whom it may concern:*

Be it known that I, KARL GEORG LAUB, engineer, residing at Mombacherstrasse No. 45, Mainz, in the Grand Duchy of Hesse, German Empire, have invented new and useful Improvements in Friction Elements, of which the following is a specification.

My invention relates to friction elements—such as journal-bushes, slide-block slippers, or the like—which are generally made of white metal or other soft metals or alloys which of themselves are not capable of offering sufficient resistance to the deforming and shearing tendencies that are caused by the parts in motion.

In order to secure a friction element or bearing which shall have a friction-surface of the proper material and which shall yet be of sufficient strength to resist deformation, I have devised a novel construction in which I make use of a skeleton consisting of a relatively hard or resistant material, such as steel or iron, which skeleton is entirely covered by the bearing or antifriction metal or alloy on that side which comes in contact with the moving part. This skeleton is suitably connected with the metal forming the bearing-surface by twisting, drawing, casting, or jointing them together, or in any other suitable manner. This skeleton is a permanent part of the friction element, and in case the antifriction metal should become worn to such an extent as to render it unfit for further use the soft metal may be removed by melting it, while the skeleton remains available for renewed use by simply casting or otherwise applying a new body of antifriction metal. In order to secure a better connection of the skeleton with the bearing metal, I may provide the skeleton with perforations, with projections, or depressions, preferably in the nature of corrugations, or I may construct the skeleton of grated or basket-like work of such external configuration as to fit the shape of the article to be formed by running in the soft metal or alloy which forms the bearing-surface. One important advantage of my invention is that I may dispense with the troughs of cast-iron or other metal which have hitherto been necessary to form a support for the soft metal.

The invention will now be described with reference to the accompanying drawings, in which—

Figure 1 is a cross-section of a journal-bearing constructed according to my invention, the left half of Fig. 1 being taken on the line 1 1 of Fig. 2 and the right half on the line 1' 1' of Fig. 2. Fig. 2 is partly a longitudinal section on line 2 2 of Fig. 1 and partly a side elevation of the skeleton. Fig. 3 is a cross-section illustrating another form of my invention, said cross-section being taken partly on line 3 3 and partly on line 3' 3' of Fig. 4. Fig. 4 is partly a longitudinal section on line 4 4 of Fig. 3 and partly a side elevation of the skeleton employed in this construction. Fig. 5 is a cross-section of still another form of my invention, the left half being taken on line 5 5 of Fig. 6 and the right half on line 5' 5' of said figure. Fig. 6 is partly a longitudinal section on line 6 6 of Fig. 5 and partly a continuation of said section with the soft metal removed, so as to show the skeleton only. Fig. 7 shows a fourth form of my invention, partly in cross-section on line 7 7 of Fig. 8. Fig. 8 is partly a longitudinal section on line 8 8 of Fig. 7 and partly a side elevation of the skeleton employed in this construction. Fig. 9 is a cross-section on line 9 9 of Fig. 10, showing a wire skeleton embedded in soft metal. Fig. 10 is a front view of a portion of this construction with parts broken away. Fig. 11 is a cross-section on line 11 11 of Fig. 12, showing a perforated plate embedded in soft metal. Fig. 12 is a face view of said construction with parts broken away. Fig. 13 is a sectional elevation on line 13 13 of Fig. 14, showing a metal grating embedded in soft metal; and Fig. 14 is a front view of this construction with part of the grating exposed.

In Figs. 1 and 2 I have shown a journal-bush C with a shoulder or flange C' at each end. The skeleton consists of two half rings or segments D, of wrought-iron or other resistant metal, which are connected by rods or struts D' disposed lengthwise of the axis of the shaft, whose journal is to be received in the bearing. The segments D being surrounded with soft metal by casting prevent distention of the metal, and the embedded struts D', which are preferably angular or square in cross-section, prevent shearing. The struts are connected by rivets. The inner surface of the segments are preferably provided with file-shaped corrugations.

In Figs. 3 and 4 I have shown a journal-bush E, made, for instance, of cast-steel, and this bush is adapted to support a heavier load than the one shown in Figs. 1 and 2. A flange E' is provided at each end, which flange surrounds disks or segments $F^3$ at the ends of the skeleton F. The central portion F' of this skeleton is made of enlarged diameter, so as to stiffen it, and upon the outside the skeleton may be provided with slotted projections $F^2$, which increase the strength of the soft metal and improve the flow of the metal during the casting operation. For the same purpose the segments $F^3$ may be provided with openings, so as to allow the soft metal to flow into them, as shown at $E^2$ in Fig. 3.

In Figs. 5 and 6 the journal-bush G is provided with a shoulder or flange G' at each end. The skeleton consists of a body of curved steel plates H H' and segments $H^2$ $H^3$ riveted together. The spaces between the plates are filled with soft metal, which is held in position by the rivets. To assist the inflow of the cast metal, openings $H^4$ may be provided in the plates, and I have indicated at $G^2$ in Fig. 5 the soft metal which enters the openings of the segments $H^2$ $H^3$. This construction is especially adapted for journal-bushes which sustain a heavy load, and in this case the surrounding soft metal will prevent any deformation of the skeleton due to the elasticity of the metal under the pressure exerted thereon.

Figs. 7 and 8 show a journal-bush I for railroad-cars, which is to be lodged in a cast-iron chamber, as usual. The skeleton J consists of pressed or bent wrought-iron, upon the two faces of which perforated wrought-iron plates J' are riveted—that is, the plates J' are spaced by the skeleton core J and are secured thereon by the rivets. The purpose of the perforations is to allow the cast soft metal a better inflow and also to give the metal sufficient strength against disintegration and other deformation. In this case also the soft metal by filling the hollow spaces will prevent any deformation of the skeleton, due to its elasticity.

In designing skeletons for the upper halves of bushes, which usually have central lubricating-apertures, care should be taken that corresponding apertures be provided in the skeleton, so that the oil-holes may have to be drilled only through the soft metal.

My invention may further be applied to the construction of flat or curved plates serving as bearing-surfaces for slide-blocks. Thus in Figs. 9 and 10 I have shown the soft metal K cast around a network made of wires L L', arranged crosswise of each other.

In Figs. 11 and 12 the soft metal K is cast around perforated plates M, and in Figs. 13 and 14 I embed in the soft metal K a skeleton consisting of a grating formed by iron strips N, connected at their intersections by rivets N'. In these cases also the skeleton embedded in the soft metal or alloy keeps the latter from deformation or disintegration.

It will be obvious that the skeleton may be formed not only of iron or steel, but of any other material possessing sufficient strength. The skeleton might be connected with the solid outer part of the bearing and the soft metal might be united to the skeleton by other processes than casting—as, for instance, by depositing the soft metal electrolytically. Casting, however, will generally be preferred on account of its simplicity and low cost.

A friction element constructed according to my invention is strong enough in itself to withstand all the strains to which it is subjected, and when used for journal-bearings the friction element forms a complete and resistant bearing and does not depend for strength upon the support to which it is secured.

Now what I claim, and desire to secure by Letters Patent, is the following:

1. A friction element consisting of a rigid skeleton of resistant material and a soft-metal body in which said skeleton is embedded, the said soft metal covering the skeleton entirely on the side adjacent to the friction-surface, so that the bearing-surface is formed by the soft metal alone.

2. A friction element which comprises a skeleton made of resistant material and provided with corrugations, and a body of soft metal which surrounds and entirely incloses the said skeleton.

3. A friction element comprising a skeleton which has a longitudinally-extending openwork body and flanges extending outwardly at the ends of said body, and a body of soft metal which surrounds and entirely incloses the said skeleton including the flanges thereof.

In testimony whereof I have signed my name to this specification in the presence of two subscribing witnesses.

KARL GEORG LAUB.

Witnesses:
 HERMANN WEIL,
 OSKAR STANDHARDT.